United States Patent
Gonzalez et al.

(10) Patent No.: US 10,755,213 B2
(45) Date of Patent: Aug. 25, 2020

(54) SYSTEM FOR RESOURCE UTILIZATION ANALYSIS AND RESOURCE ALTERATION

(71) Applicant: BANK OF AMERICA CORPORATION, Charlotte, NC (US)

(72) Inventors: Marissa Gonzalez, Pennington, NJ (US); Heinrich Smit, San Diego, CA (US); Allyn Lyzohn Shaw, Brooklyn, NY (US); Frank Andreas Steinebrunner, Peekskill, NY (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 171 days.

(21) Appl. No.: 15/866,842

(22) Filed: Jan. 10, 2018

(65) Prior Publication Data
US 2019/0213514 A1 Jul. 11, 2019

(51) Int. Cl.
*G06Q 10/00* (2012.01)
*G06Q 10/06* (2012.01)
*H04L 29/08* (2006.01)

(52) U.S. Cl.
CPC .. *G06Q 10/06312* (2013.01); *G06Q 10/06313* (2013.01); *G06Q 10/06315* (2013.01); *G06Q 10/06375* (2013.01); *H04L 67/10* (2013.01)

(58) Field of Classification Search
None
See application file for complete search history.

(56) References Cited

U.S. PATENT DOCUMENTS

| | | |
|---|---|---|
| 6,557,008 B1 | 4/2003 | Temple et al. |
| 6,564,209 B1 | 5/2003 | Dempski et al. |
| 6,675,149 B1 | 1/2004 | Ruffin et al. |
| 6,727,927 B1 | 4/2004 | Dempski et al. |
| 6,900,807 B1 | 5/2005 | Liongosari et al. |
| 7,120,592 B1 | 10/2006 | Lewis |
| 7,162,427 B1 | 1/2007 | Myrick et al. |
| 7,403,901 B1 * | 7/2008 | Carley ............... G06F 16/258 705/2 |
| 7,801,826 B2 | 9/2010 | Labrou et al. |
| 8,175,909 B1 | 5/2012 | Pileri et al. |

(Continued)

OTHER PUBLICATIONS

Laoutaris, Nikolaos, On the Optimization of Storage Capacity Allocation for Content Distribution, Dec. 18, 2003, University of Athens, https://core.ac.uk/download/pdf/206144738.pdf, p. 1-27.*

*Primary Examiner* — Joseph M Waesco
(74) *Attorney, Agent, or Firm* — Michael A. Springs; Moore & Van Allen PLLC; James C. Edwards

(57) ABSTRACT

A system directed to analyzing technology resources in terms of many different factors to determine a need to alter/adjust the technology resource. Specifically, the present invention correlates data associated with (i) a level of performance of a technology resource relative to technology resource users, (ii) results of the technology resource relative to facility users, and (iii) a qualitative value associated with the technology resource to determine a technology resource metric that indicates a need to alter/adjust the technology resource and trigger one or more actions associated with altering/adjusting the technology resource. In specific embodiments, the technology resource metric of one facility is compared to one or a plurality of other facilities to determine a technology resource index for the technology resource.

14 Claims, 4 Drawing Sheets

(56) References Cited

U.S. PATENT DOCUMENTS

| | | | |
|---|---|---|---|
| 8,206,527 B2 | 6/2012 | Strunk | |
| 8,311,863 B1 | 11/2012 | Kemp | |
| 8,468,090 B2 | 6/2013 | Lesandro et al. | |
| 9,497,136 B1* | 11/2016 | Ramarao | G06F 9/45558 |
| 2002/0078046 A1 | 6/2002 | Uluakar et al. | |
| 2002/0133392 A1 | 9/2002 | Angel et al. | |
| 2002/0184128 A1 | 12/2002 | Holtsinger | |
| 2003/0135399 A1 | 7/2003 | Ahamparam et al. | |
| 2003/0172002 A1 | 9/2003 | Spira et al. | |
| 2004/0215536 A1* | 10/2004 | Deliwala | G06Q 10/10 705/34 |
| 2006/0085255 A1 | 4/2006 | Hastings et al. | |
| 2012/0109882 A1 | 5/2012 | Bouse et al. | |
| 2013/0036221 A1* | 2/2013 | Pishevar | H04L 67/1095 709/224 |
| 2013/0144676 A1* | 6/2013 | O'Sullivan | G06Q 10/06313 705/7.22 |
| 2013/0346594 A1* | 12/2013 | Banerjee | G06F 11/3495 709/224 |
| 2014/0089511 A1* | 3/2014 | McLean | H04L 67/10 709/226 |
| 2014/0280952 A1* | 9/2014 | Shear | H04L 63/10 709/226 |
| 2014/0344462 A1* | 11/2014 | Pabari | G06F 9/50 709/226 |
| 2014/0358944 A1* | 12/2014 | Brower, Jr. | G06F 16/95 707/748 |
| 2014/0379411 A1* | 12/2014 | Earle | G06Q 10/06315 705/7.25 |
| 2015/0051957 A1 | 2/2015 | Griebeler et al. | |
| 2015/0365309 A1* | 12/2015 | Kaminski | H04L 43/0817 709/224 |
| 2016/0112341 A1* | 4/2016 | Lui | H04L 43/0817 709/226 |
| 2016/0124830 A1* | 5/2016 | Banerjee | G06F 11/3447 714/37 |
| 2016/0285710 A1* | 9/2016 | Ye | H04L 43/04 |
| 2017/0272436 A1* | 9/2017 | Ali | G06F 9/54 |
| 2018/0096274 A1* | 4/2018 | Dezeeuw | G06F 7/08 |
| 2018/0367467 A1* | 12/2018 | Shear | H04L 63/10 |
| 2019/0052575 A1* | 2/2019 | Kaminski | H04L 47/70 |

* cited by examiner

SYSTEM FOR RESOURCE UTILIZATION ANALYSIS AND RESOURCE ALTERATION

FIELD OF THE INVENTION

The present invention is generally directed to technology resource analysis and alteration and, more specifically, using level of performance for a technology resources relative technology resource users, results of the technology resource relative facility users and a qualitative value associated with the technology resource to determine a need to alter a technology resource and trigger an action associated with the altering the technology resource.

BACKGROUND

Facilities have need to alter technology resources, such as increase or decrease hardware, middleware, software or the like. Such alteration to technology resources may have an effect on the overall volume of resources generated by the facility. However, it is often difficult to determine when and the degree of technology resource alteration without properly assessing determinative factors that drive technology resource alteration.

For example, while level of performance of the technology resource relative to the technology resource users and a qualitative value of the technology resources may be determinative of altering resources, such determinative factors may not provide for a comprehensive assessment as to when technology resource alteration should occur and the degree of the technology resource alteration.

Moreover, in determining when and to what degree a technology resource should be altered it may be beneficial to compare the determinative factors of one facility to the same determinative factors of one or more other similar facilities in order to assess or otherwise predict the overall volume of resources that are expected to be generated based on an increase in the qualitative value and or a change in other determinative factors (e.g., level of performance, results and the like).

Therefore, a need exists to provide for a system that analyzes technology resources in terms of many different determinative factors to determine a need to alter/adjust the technology resource. Specifically, a need exists to analyze the technology resource so as to insure that altering/adjusting the technology resource maximizes the qualitative value of the technology resource. In addition, a need exists to compare the same technology resource alteration determinative factors from one facility to one or more similar facilities to predict the overall volume of resources that are expected to be generated based on an increase in the qualitative value and or a change in other determinative factors (e.g., level of performance, results and the like).

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods directed to analyzing technology resources in terms of many different determinative factors to determine a need to alter/adjust the technology resource. Specifically, the present invention correlates data associated with a level of performance of a technology resource relative to technology resource users, results of the technology resource relative to facility users and a qualitative value associated with the technology resource to determine a technology resource metric that indicates a need to alter/adjust the technology resource and trigger one or more actions associated with altering/adjusting the technology resource.

In additional embodiments, the technology resource technology metric of one facility is compared to same/similar determined technology resource metric(s) of one or more other facilities as a means of deriving an index that is used to predict an overall volume of resources that are expected to be generated based on an increase in the qualitative value and or a change in other determinative factors (e.g., level of performance relative to technology resource users, results relative to facility users and the like).

As a result, the present invention provides a more comprehensive and accurate means for analyzing a technology resource for determining when and how to alter/adjust a technology resource and triggering actions associated with the altering/adjustment of the technology resource.

A system for technology resource utilization analysis and associated technology-related resource alteration defines first embodiments of the invention. The system includes a computing platform including a memory and at least one processor in communication with the memory. The system additionally includes a first database configured to store, in the memory, first data that indicates, for each of a plurality of facilities, a level of performance for each of a plurality of technology resources relative to a plurality of technology resource users. The system additionally includes a second database configured to store, in the memory, second data that indicates, for each of the facilities, results for each of the technology resources relative to a plurality of facility users and a third database configured to store, in the memory, third data that indicates, for each of the facilities, a qualitative value associated with each of the technology resources. The system additionally includes a technology resource metric engine that is stored in the memory and executable by the at least one processor. The technology resource metric engine is configured to correlate, for one of the facilities and each of the technology resources, the first, second and third data associated with the facility to determine a technology resource metric that indicates a need to adjust the technology resource. Additionally, the system is configured to trigger at least one action associated with adjusting the corresponding technology resource based on the determined technology resource metric.

In specific embodiments the system further is configured to compare the technology resource metric to one or more technology resource metrics of one or more of the plurality of facilities to determine a technology resource index. In such embodiments of the system, determination of the technology resource index (or determination that the technology resource meets or exceeds an index threshold) may trigger at least second action. In other related embodiments of the system, based on the technology resource index and an adjustment to the qualitative value associated with the technology resource, a prediction may be made of at least one of (i) the level of performance for the technology resource relative to the technology resource users, and (ii) the results for the technology resource relative to the facility users.

In specific embodiments the system further includes a technology resource index engine that is stored in the memory and executable by the at least one processor. The technology resource index engine is configured to compare the technology resource metric to one or more technology resource metrics of one or more of the plurality of facilities to determine a technology resource index. In such embodiments of the system the technology resource action engine may be further configured to trigger at least one second action in response to determining that the technology resource index meets or exceeds a predetermined technology resource index threshold.

In other related embodiments the system may include a predictive result engine that is stored in the memory and executable by the processor. The predictive result engine is configured to predict, based on the technology resource index and an adjustment to the qualitative value associated with the technology resource, at least one of (i) the level of performance for the technology resource relative to the technology resource users, and (ii) the results for the technology resource relative to the facility users. In such embodiments of the system, the predictive result engine may be further configured to predict, based on the technology resource index, a resource accumulation increase based on an increase to the qualitative value associated with the technology resource.

In still further related embodiments the system includes a technology resource index tiering engine that is stored in the memory and executable by the at least one processor. The technology resource index tiering engine is configured to automatically adjust tiering of the facility based on the determined technology resource index.

In specific embodiments of the system, the first database is further is configured to receive the first data through periodic assessments of the technology resource users as to a level of satisfaction with the technology resource. In other specific embodiments of the system, the second database is configured to receive the second data through periodic assessments of the facility users as to level of satisfaction with at least one of (i) the facility and (ii) the technology resource. In still further specific embodiments of the system, the third database is further configured to store the third data that indicates, for each of the facilities, the qualitative value associated with each of the technology resources, such that, the qualitative value is at least one (i) an expenditure over a period of time associated with the technology resource, and (ii) an appreciation or depreciation of the technology resource.

In still further specific embodiments of the system, the technology resource metric engine is further configured to determine a technology resource metric that indicates a need to trigger an action associated with the corresponding technology resource, wherein the action is at least one of (i) adjustment to the qualitative value associated with the technology resource, and (ii) a non-qualitative change to the technology resource.

Moreover, in additional specific embodiments of the system the technology resource metric engine is further configured to correlate, for one of the facilities and each of the technology resources, the first, second and third data associated with a segment of the facility to determine a segment-specific technology resource metric that indicates a need to trigger an action within the segment associated with the corresponding technology resource.

Additionally, according to specific embodiments of the system the technology resource action engine may be further configured to trigger at least one action associated with adjusting the corresponding technology resource based on the determined technology resource metric, such that, the action is a temporal action that is implemented for a predetermined period of time or until an occurrence of a triggering event.

A computer-implemented method for technology resource utilization analysis and associated technology-related resource alteration defines second embodiments of the invention. The method includes receiving (i) first data that indicates, for each of a plurality of facilities, a level of performance for each of a plurality of technology resources relative to a plurality of technology resource users, (ii) second data that indicates, for each of the facilities, results for each of the technology resources relative to a plurality of facility users, and (iii) third data that indicates, for each of the plurality of facilities, a qualitative value associated with each of the plurality of technology resources. In addition, the method includes correlating, for one of the facilities and each of the technology resources, the first, second and third data associated with the facility to determine a technology resource metric that indicates a need to adjust the technology resource. Additionally, the method includes, in response to determining the technology resource metric, triggering of at least one action associated with adjusting the corresponding technology resource based on the determined technology resource metric.

In further embodiments the method includes comparing the technology resource metric to one or more technology resource metrics of one or more of the facilities to determine a technology resource index. In such embodiments the method may further include, in response to determining the technology resource index meets or exceeds a predetermined technology resource index threshold, triggering at least one second action. In other related embodiments the method includes predicting, based on the technology resource index and an adjustment to the qualitative value associated with the technology resource, at least one of (i) the level of performance for the technology resource relative to the technology resource users and (ii) the results for the technology resource relative to the facility users. In further embodiments of the method predicting further includes predicting, based on the technology resource index, a resource accumulation increase based on an increase to the qualitative value associated with the technology resource.

A computer program product including a non-transitory computer-readable medium defines third embodiments of the invention. The computer-readable medium includes a first set of codes for causing a computer to receive first data that indicates, for each of a plurality of facilities, a level of performance for each of a plurality of technology resources relative to a plurality of technology resource users, a second set of codes for causing a computer to receive second data that indicates, for each of the facilities, results for each of the technology resources relative to a plurality of facility users, and a third set of codes for causing a computer to receive third data that indicates, for each of the facilities, a qualitative value associated with each of the technology resources. The computer-readable medium additionally includes a fourth set of codes for causing a computer to correlate, for one of the facilities and each of the technology resources, the first, second and third data associated with the facility to determine a technology resource metric that indicates a need to adjust the technology resource. Additionally, the computer-readable medium includes a fifth set of codes for causing a computer to, in response to determining the technology resource metric, trigger at least one action associated with adjusting the corresponding technology resource based on the determined technology resource metric.

In specific embodiments of the computer program product the computer-readable medium includes a sixth set of codes for causing a computer to compare the technology resource metric to one or more metrics of one or more of the technology resource facilities to determine a technology resource index. In such embodiments of the computer program product the computer-readable medium includes a seventh set of codes for causing a computer to, in response to determining the technology resource index meets a predetermined technology resource index threshold, trigger at least one second action. In other specific embodiments of the computer program product the computer-readable medium further includes a seventh set of codes for causing a computer to predict, based on the technology resource index and an adjustment to the qualitative value associated with the technology resource., at least one of (i) the level of performance for the technology resource relative to the technology resource users and (ii) the results for the technology resource relative to the facility users.

Thus, according to embodiments of the invention, which will be discussed in greater detail below, the present invention provides for analyzing technology resources in terms of many different factors to determine a need to alter/adjust the technology resource. Specifically, the present invention correlates data associated with (i) a level of performance of a technology resource relative to technology resource users, (ii) results of the technology resource relative to facility users, and (iii) a qualitative value associated with the technology resource to determine a technology resource metric that indicates a need to alter/adjust the technology resource and trigger one or more actions associated with altering/adjusting the technology resource. In additional embodiments, the technology resource technology metric of one facility is compared to same/similar determined technology resource metric(s) of one or more other facilities as a means of deriving an index that is used to predict an overall volume of resources that are expected to be generated based on an increase in the qualitative value and or a change in other determinative factors (e.g., level of performance relative to technology resource users, results relative to facility users and the like).

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
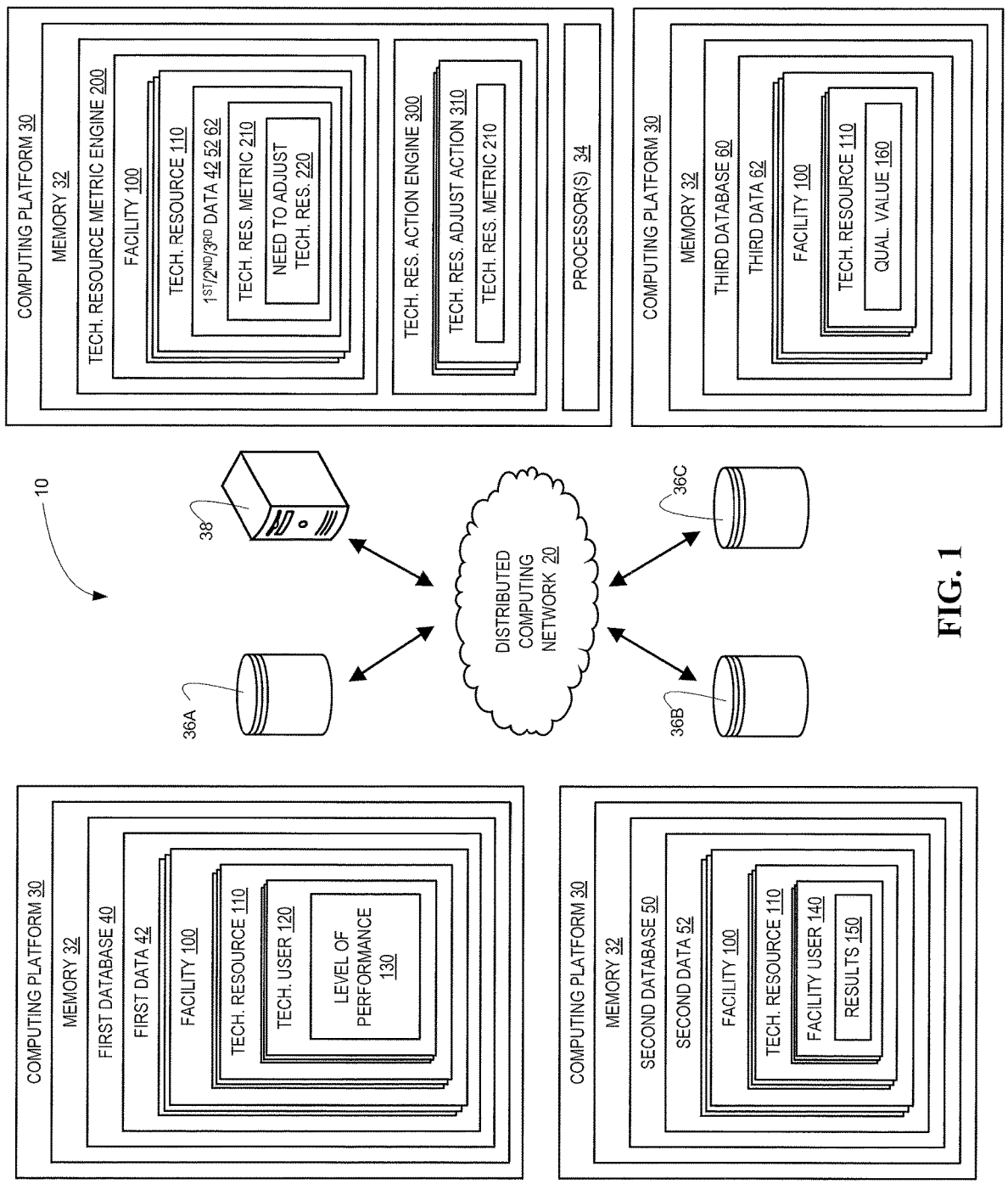
Figure 2:
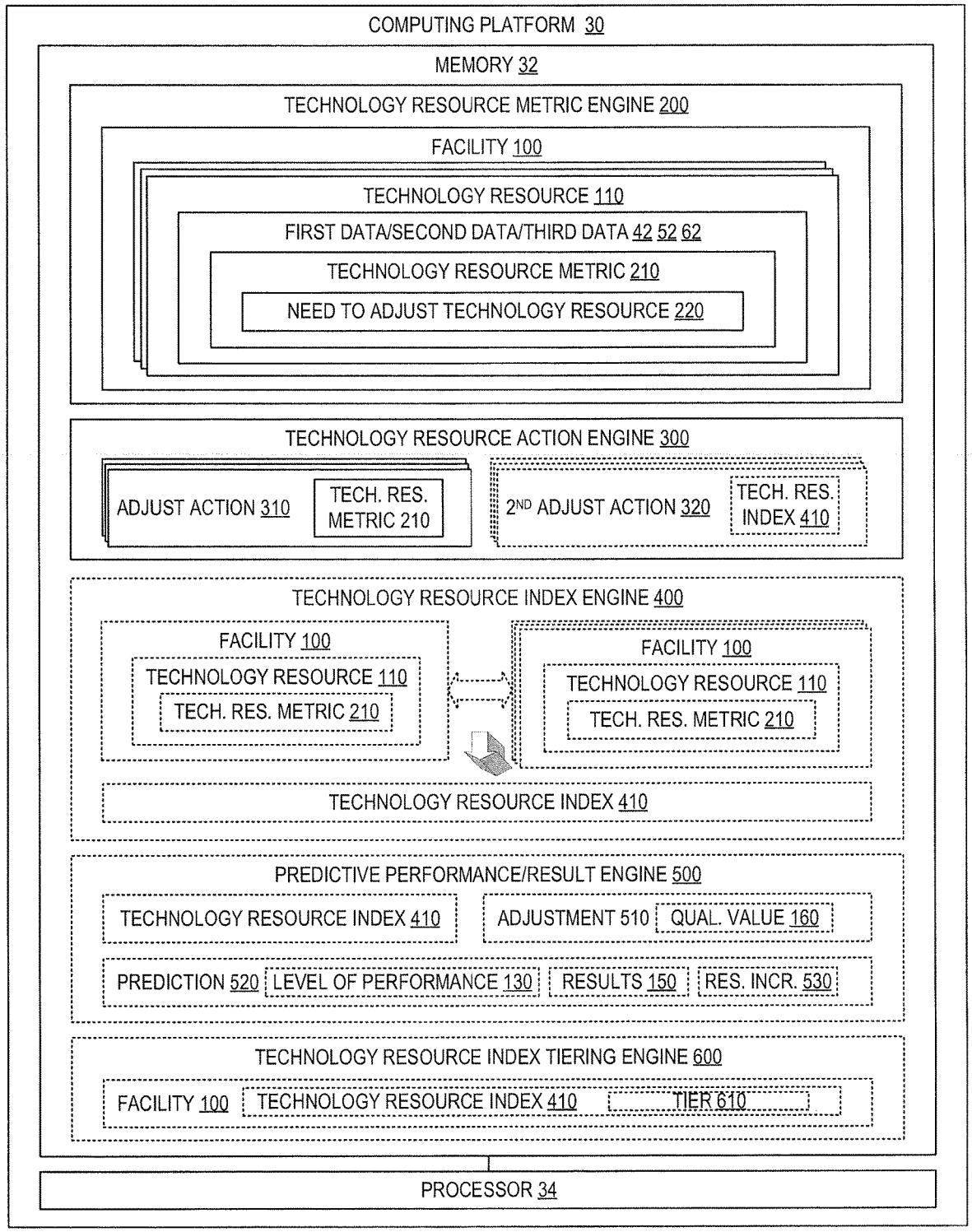
Figure 3:
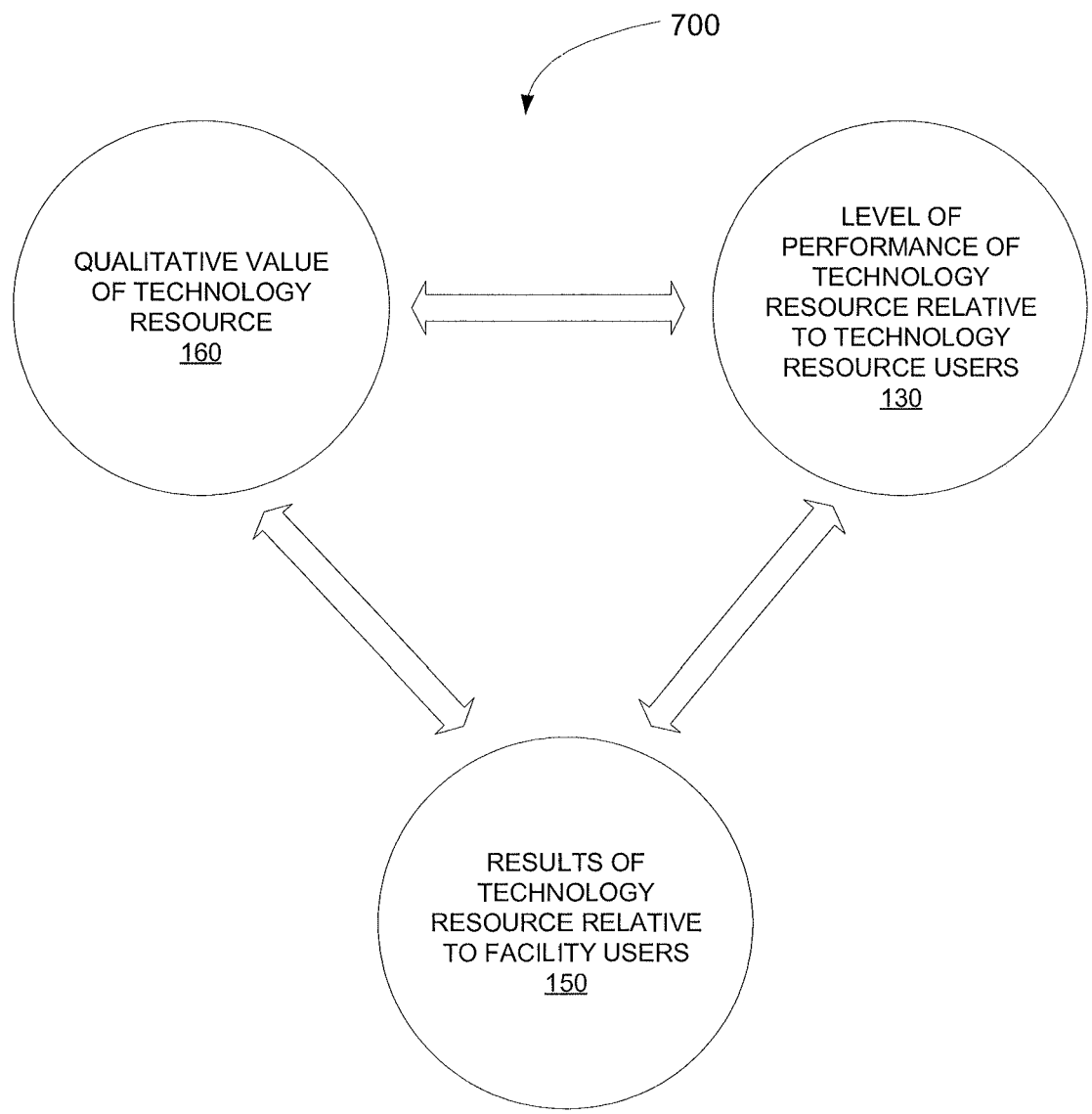
Figure 4:
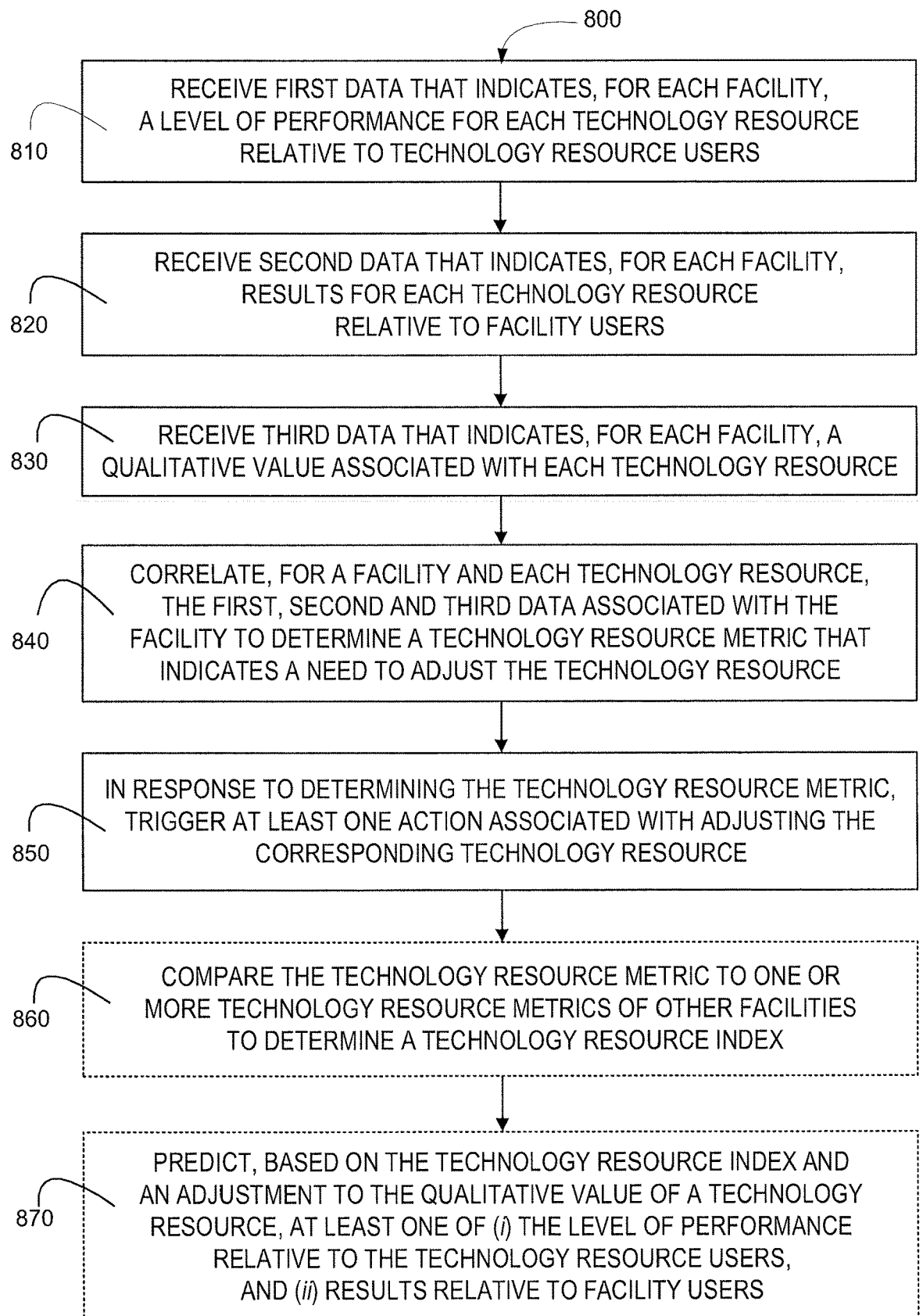

Having thus described embodiments of the invention in general terms, reference will now be made the accompanying drawings, wherein:

FIG. 1 provides a schematic diagram of a system for technology resource utilization analysis and resource alteration, in accordance with embodiments of the invention;

FIG. 2 provides a block diagram of a computing platform for technology resource utilization analysis and resource alteration, in accordance with alternate embodiments of the invention;

FIG. 3 provides a schematic diagram illustrating correlation of technology resource level of performance data, results data and qualitative value, in accordance with embodiments of the invention; and FIG. 4 provides a flow diagram of a method for technology resource utilization analysis and resource alteration, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and the like are described in detail for analyzing technology resources in terms of many different factors to determine a need to alter/adjust the technology resource. Specifically, the present invention correlates data associated with a level of performance of a technology resource relative to technology resource users, results of the technology resource relative to facility users and a qualitative value associated with the technology resource to determine a technology resource metric that indicates a need to alter/adjust the technology resource and trigger one or more actions associated with altering/adjusting the technology resource.

In additional embodiments, the technology resource technology metric of one facility is compared to same/similar determined technology resource metric(s) of one or more other facilities as a means of deriving an index that is used to predict an overall volume of resources that are expected to be generated based on an increase in the qualitative value and or a change in other determinative factors (e.g., level of performance relative to technology resource users, results relative to facility users and the like).

As a result, the present invention provides a more comprehensive and accurate means for analyzing a technology resource for determining when and how to alter/adjust a technology resource and triggering actions associated with the altering/adjustment of the technology resource.

Referring to FIG. 1 a schematic diagram is shown of a system 10 for analyzing technology resources for the purpose of determining a need to adjust/alter the resources, in accordance with embodiments of the invention. The system 10 is implemented in a distributed computing network 20, which allows for computerized communication of data between different computing platforms, apparatus, devices and the like. The distributed computing network 20 may include one or more intranets, the Intranet including cloud computing and/or a combination of the Internet and one or more intranets.

The system 100 includes a computing platform 30 having memory and one or more processors 34 in communication with the memory 32. As shown in FIG. 1, the computing platform 30 may include multiple computing devices, such as storage units 36A, 36B, 36C and server 38 and the like, disposed throughout the distributed computing network 20. As such, memory 32 and processors(s) 34 may reside in and/or be in communication with multiple computing devices.

Memory 32 of computing platform 30 is configured to store first database 40 that includes first data 42 that indicates, for a plurality of facilities 100 and for a plurality of technology resources 110, a level of performance 130 for each technology resource 110 relative to a plurality of technology users 120. The technology resources may include, but are not limited to, software, middleware, hardware or the like. It should be noted that while FIG. 1 shows one first database 40 that stores first data 42 for a plurality of facilities 100, first database 40 may comprise multiple databases 40 distributed throughout the computing network 20 with each first database 40 storing first data 42 for an individual facility 100 or for a segment of the plurality of facilities 100.

Memory 32 of computing platform 30 is configured to store second database 50 that includes second data 52 that indicates, for a plurality of facilities 100 and for a plurality of technology resources 110, results 150 for each technology resource 110 relative to a plurality of facility users 140. Similar to the first database 40, FIG. 1 shows one second database 50 that stores second data 52 for a plurality of facilities 100; however, second database 50 may comprise multiple second databases 50 disposed throughout computing network 20 with each second database 50 storing second data 52 for an individual facility 100 or for a segment of the plurality of facilities 100.

Additionally, memory 32 of computing platform 30 is configured to store third database 60 that includes third data 62 that indicates, for each of the facilities 100 and for each of the technology resources, a qualitative value 160 associated with each of the technology resources 100. Similar to the first and second databases 40 and 50, FIG. 1 shows one third database 60 that stores third data 62 for the plurality of facilities 100; however, third database 60 may comprise multiple third databases 60 disposed throughout computing network 20 with each third database 50 storing third data 62 for an individual facility 100 or for a segment of the plurality of facilities 100.

First data 42, second data 52 and third data 62 may be generated and received into respective first database 40, second database 52 and third databases 62 on an ongoing basis, such as dynamically, periodically or the like or on an as-needed basis (i.e., based on a need to assess the technology resource and/or determine if adjustment/alteration of the technology resource is necessary). Moreover, while first, second and third data 42, 52 and 62 are shown and described as being stored individual databases (i.e., first, second and third databases 40, 50 and 60), in other embodiments of the system, first, second and third data 42, 52 and 62 may be combined into one or two comprehensive databases or the like.

Memory 32 of computing platform 30 additionally includes technology resource metric engine 200 that is configured to access the databases to receive first, second and third data 42, 52 and 62 and correlate, for one of the plurality of facilities 100 and each of the technology resources 110, the data associated with the respective facility 100 to determine a technology resource metric 210 that indicates, or is otherwise used to determine, a need to adjust/alter 220 the respective resource. Adjusting/altering 220 the technology resource 110 may include, but is not limited to, increasing or decreasing the technology resource 110, upgrading or downgrading the technology resource, acquiring new technology resources, eliminating the technology resource or the like. In alternate embodiments of the invention, the technology resource metric 210 may be determined manually, absent the need to implement the technology metric engine 200.

Additionally, memory 32 of computing platform 30 additionally stores technology resource action engine 300 that is configured to trigger at least one technology resource adjustment action 310 based on the determined technology resource metric 210. In specific embodiments of the system, the technology resource adjustment action 310 may be triggered based on the determined technology resource metric 210 meeting, exceeding or falling below a predetermined technology resource metric threshold. The technology resource adjustment action 310 may include, but is not limited to, actions associated with increasing or decreasing technology resources (e.g., allocating more or less technology resources, initiating alerts/notifications related to the allocation of more or less technology resources and the like). In alternate embodiments of the invention, the one technology resource adjustment action 310 may be triggered manually, obviating the need to implement and include in the invention the technology resource action engine 300.

Referring to FIG. 2 a block diagram is shown of a computing platform configured to analyze technology resource utilization and determine resource alteration, in accordance with embodiments of the present invention. In addition to providing greater detail, FIG. 2 highlights various alternate embodiments of the invention. The computing platform 30 may include one or more of any type of computing device, such as one or more servers, storage devices, personal computers or the like or may include cloud computing components. The present systems and methods can accordingly be performed on any form of one or more computing devices.

The computing platform 30 is configured to receive and execute engines/algorithms, such as routines, applications and the like. Computing platform 30 includes memory 32, which may comprise volatile and non-volatile memory, such as read-only and/or random-access memory (RAM and ROM), EPROM, EEPROM, flash cards, or any memory common to computer platforms. Further, memory 32 may include one or more flash memory cells, or may be any secondary or tertiary storage device, such as magnetic media, optical media, tape, or soft or hard disk. Moreover, memory 32 may comprise cloud storage, such as provided by a cloud storage service and/or a cloud connection service.

Further, computing platform 30 also includes one or more processors 34, which may be an application-specific integrated circuit ("ASIC"), or other chipset, processor, logic circuit, or other data processing device. Processors 34 or other processor such as ASIC may execute an application programming interface ("API") (not shown in FIG. 2) that interfaces with any resident programs, such as data and engines, routines, sub-modules associated therewith or the like stored in the memory 32 of the computing platform 30.

Processor 34 includes various processing subsystems (not shown in FIG. 2) embodied in hardware, firmware, software, and combinations thereof, that enable the functionality of computing platform 30 and the operability of the system 10 on distributed computing network 20. For example, processing subsystems allow for initiating and maintaining communications and exchanging data with other networked devices, such as storage units 36A-C, server 38 and the like shown in FIG. 1. For the disclosed aspects, processing subsystems of processor 34 may include any subsystem used in conjunction with technology resource metric engine 200, technology resource action engine 300, technology resource index engine 400, predictive performance/result engine 500, technology resource index tiering engine 600 and related algorithms, sub-algorithms, modules, sub-modules thereof.

Computer platform 30 may additionally include communications module (not shown in FIG. 2) embodied in hardware, firmware, software, and combinations thereof, that enables communications among the various components of the computing platform 30 and system 10, as well as between the other networked devices. Thus, communication module may include the requisite hardware, firmware, software and/or combinations thereof for establishing and maintaining a network communication connection.

As previously discussed in relation to FIG. 1, the memory 32 of computing platform 30 stores technology resource metric engine 200 that is configured to access first, second and third databases 40, 50 and 60 (shown in FIG. 1) to retrieve first, second and third data 42, 52 and 62 and correlate the data 42, 52, 62, for a specific facility 100, to determine a technology resource metric 210 for one or more technology resources 110. The technology resource metric 210 indicates, or is otherwise used to determine, a need to adjust/alter 220 the respective technology resource. Adjusting/altering 220 the technology resource 110 may any action that changes the technology resource including, but not limited to, increasing or decreasing the technology resource 110, upgrading or downgrading the technology resource, acquiring new technology resources, eliminating the technology resource or the like. As previously noted, in alternate embodiments of the invention, the technology resource metric 210 may be determined manually and, in such embodiments, the technology resource metric engine 200 may be excluded.

The technology resources 110 may comprise a specific software application, middleware or hardware/device or, any other technology resource having an impact on user's productivity and/or satisfaction. In other embodiments of the invention, the technology resources 110 may be specific category of technology resources. For example, categories of technology resources may include, but are not limited to, mobility services, collaboration services (e.g., messaging services, interactive presentation services, email services and the like), print/facsimile services, voice communication services, computing services, network services and the like.

In specific embodiments of the system, the first data 42 that indicates a level of performance 130 for the technology resource 110 relative to technology resource users 120 may be acquired by surveying/polling the technology resource users 120 (i.e., internal associates/employees of the facility/enterprise) as to their experience with the technology resource (i.e., their respective satisfaction, and/or productivity with the technology resource 110. In such embodiments of the system, the technology resource users 120 may be polled surveyed on a predetermined basis or on a dynamic basis (e.g., based on need to determine if adjustment/alteration to a technology resource is warranted). In specific embodiments, all technology resource users 120 are surveyed/polled, while in other embodiments of the invention or a specified segment of the technology resource users 120 are surveyed/polled. In specific embodiments of the invention, the technology resource users 120 may be segmented into categories (e.g., user/associate type, segment/division/line of facility/business) for the purpose of determining a level of performance 130 for the technology resource 110 relative to the technology resource users 120 for the specific user type and/or within the specific segment/division/line of facility/business, such that that determined technology resource metric 210 is associated with the specific user type and/or specific segment/division/line of facility/business. In specific embodiments of the system, the raw results of the surveying/polling may be combined to form a quantitative indicator of the level of performance 130 of the technology resource 110 (e.g., a score indicating an overall level of performance/satisfaction for a technology resource).

In specific embodiments of the system, the second data 42 that indicates results 150 for the technology resource 110 relative to facility users 140 may be acquired by surveying/polling the facility users 120 (i.e., customers of the facility/business) as to their experience with the facility and/or the technology resource (i.e., their respective satisfaction with the facility/business 100 or, in certain embodiments, with the technology resource, if the facility users 140 interact with the technology resource. In such embodiments of the system, the facility users 140 may be polled surveyed on a predetermined basis or on a dynamic basis (e.g., based on need to determine if adjustment/alteration to a technology resource is warranted) from any interface channel in which the facility user interfaces with the facility (e.g., in-person, call center, computing device, mobile application, Internet or the like). In specific embodiments of the invention, third-party entities may be responsible for acquiring the facility user survey/poll data. In specific embodiments of the invention, the facility users 140 may be segmented into categories (e.g., user type, segment/division/line of facility/business used by the facility user) for the purpose of determining results 150 for the technology resource 110 relative to the facility users 140 for the specific facility user type and/or within the specific segment/division/line of facility/business, such that that determined technology resource metric 210 is associated with the specific user type and/or specific segment/division/line of facility/business. In other specific embodiments the second data 52 may be specific to an interface channel, such that the results 150 and the technology resource metric 210 are specific to an interface channel. In specific embodiments of the system, the raw results of the surveying/polling may be combined to form a quantitative indicator of the results 150 of the technology resource 110 (e.g., a score indicating an overall results 150 for a technology resource 110).

In specific embodiments of the system, the third data 42 that indicates a quantitative value for the technology resource 110 is at least one of at least one (i) an expenditure/cost over a period of time associated with the technology resource, and/or (ii) an appreciation or depreciation of the technology resource.

The memory 32 of computing platform 30 additionally stores technology resource action engine 300 that is configured to trigger at least one technology resource adjustment action 310 based on the determined technology resource metric 210. In specific embodiments of the system, the technology resource adjustment action 310 may be triggered based on the determined technology resource metric 210 meeting, exceeding or falling below a predetermined technology resource metric threshold. The technology resource adjustment action 310 may be any action that adjusts or otherwise changes the technology resource. Examples of technology resource adjustment actions 310 include, but are not limited to, actions associated with increasing or decreasing technology resources (e.g., allocating more or less technology resources, initiating alerts/notifications related to the allocation of more or less technology resources and the like).

In alternate embodiments of the invention the memory 32 of computing platform 30 additionally stores technology resource index engine 400 that is configured to compare the technology resource metric 210 for a specified technology resource 110 of a facility 100 to one or more metrics 210 of the technology resource 110 of one or more of the plurality of facilities 100 to determine a technology resource index 410 for the facility 100 and for the technology resource 110. In such embodiments of the invention, the first, second and third data 42, 52 and 62 is shared amongst the plurality of facilities 100 in a benchmarking/information exchange capacity, such that one facility is able to index, or otherwise benchmark, their technology resource metrics 210 against their competitors metrics 210 as a means of determining indices 410 that indicate how the facility compares to their competitors in terms of need for technology resource adjustment.

In such embodiments of the invention, the technology resource action engine 300 may be further configured to trigger at least one second action 320 in response to determining that a technology resource index 410 meets, exceeds or falls below a predetermined technology resource index threshold. The second technology resource adjustment action 310 may include, but is not limited to, actions associated with increasing or decreasing technology resources (e.g., allocating more or less technology resources, initiating alerts/notifications related to the allocation of more or less technology resources and the like).

In specific embodiments of the invention, the technology resource adjustment action 210 and/or the second resource adjustment action 310 may be a temporal action that is implemented for predetermined period of time or a period of time that runs until the occurrence of a specified action (e.g., a threshold is met or another event occurs). For example, in one specific embodiments the adjustment action 210 or 310 that is triggered is an increase in the storage capacity for electronic mail (i.e., email) and/or voice mail mailboxes. In such embodiments of the invention the increase may be for a predetermined time period that coincides with a period of heavy user receipt of email or voice mail or the increase in storage capacity may occur until a triggering event occurs.

In other alternate embodiments of the system, memory 32 of computing platform 30 additionally includes predictive performance engine 500 that is configured to predict 520, based on the technology resource index 210 and adjustment 510 to the qualitative value 160 associated with the technology resource 110, at least one of (i) the level of performance 130 for the technology resource 110 relative to the technology resource users 120, and (ii) the results 150 for the technology resource 110 relative to the facility users 150. (e.g., an increase or decrease in the expenditure associated with the technology resource 110 required to realize a specified increase or decrease in the level of performance 130 of the technology resource 110 relative to the technology resource users 120 and/or a specified increase or decrease in the results 150 for the technology resource 110 relative to the facility users 150). In other embodiments of the system, the predictive performance engine 500 is configured to predict 520, based on the technology resource index 210 and adjustment 510 to one or more of the (i) the level of performance 130 for the technology resource 110 relative to the technology resource users 120, and (ii) the results 150 for the technology resource 110 relative to the facility users 150, a qualitative value 160 increase or decrease for the technology resource 110 (e.g., an increase or decrease in the level of performance 130 of the technology resource 110 relative to the technology resource users 120 and/or the results 150 for the technology resource 110 relative to the facility users 150 required to realize a specified increase or decrease in the qualitative value 160 of the technology resource 110).

In alternate embodiments of the invention, the comparison of the technology resource metric 210 to one or more technology resource metrics 210 of one or more of the plurality of facilities 100 to determine a technology resource index 410 for the facility 100 and for the technology resource 110 may be conducted manually. Thus, obviating the need to implement the technology resource index engine 400. In addition, in further embodiments of the invention, the second resource adjustment action 310 may be manually triggered thus, obviating the need to implement or otherwise include the technology resource action engine 300. In still further specific embodiments, the predictions performed by the predictive performance engine 500 may be manually determined based on the technology resource index 210 and/or an adjustment 510 to either the qualitative value 160, the performance level 130 and/or the results 150 and, thus, in such embodiments the predictive performance engine 500 may be excluded.

In still further specific embodiments of the system, the memory 32 of computing platform 30 includes technology resource index tiering engine 600 that is configured to, in response to determining the technology resource index 410 for a specified technology resource 110, adjust the tiering 610 for the facility 100. In this regard, multiple facility tiers may exists (e.g., a first tier, a second tier, a third tier and the like) based on the technology resource index 210 of a facility 100 for a specified technology resource 110. As the technology resource index 410 for a facility 100 and the specified resource 110 changes over time, the tier 610 in which the facility 100 resides may change.

Referring to FIG. 3, a schematic diagram is shown of the interplay between level of performance, results and qualitative value of a technology resource, in accordance with embodiments of the present invention. The interplay works under the general assumption that as the quantitative value (e.g., cost/investment to a technology resource) increases the level of performance of the technology resource will increase, as well as, the overall results of the technology resource (i.e., the satisfaction of the customers with the facility and/or segment of the facility). However, the degree to which level of performance and/or results increases will vary from technology resource to technology resource based on many different factors. In this regard, a small increase in cost/investment to a technology resource may result in significant increase to the level of performance (e.g., associate satisfaction with the technology result) and/or results (e.g., customer's satisfaction with facility and/or segment of the facility). While in other instances, a large increase in cost/investment to a technology resource may result in a minimal increase to the level of performance (e.g., associate satisfaction with the technology result) and/or results (e.g., customer's satisfaction with facility and/or segment of the facility). As previous discussed a technology resource may be any technology related element that has an effect on the productivity and or satisfaction of the user. In specific embodiments of the invention the technology resource may include, but is not limited to, collaboration resources (e.g., tele/video conferencing applications, shared file applications, electronic mail applications, and the like); voice communication resources (e.g., telephone hardware and the like), mobility resources (e.g., remote access applications and the like); computing resources (e.g., PCs, laptops, smart phones and the like); print and facsimile services; security resources (e.g., anti-virus malware applications, encryption applications and the like); Internet resources (e.g., browser applications and the like); networking resources; hosting/storage resources; service desk resources and the like.

As previously discussed, the level of performance 130 of a technology resource relative to technology resource users may include surveying/polling users of the technology resource (e.g., associates, employees or the like) as their satisfaction with the technology resource in terms of such factors as (i) engagement, (ii) productivity, (iii) adoption, (iv) retention and (v) effectiveness). The results of the level of performance survey/poll may be quantified in a level of performance score or index that is capable of being correlated with technology resource results 150.

The results 150 of the technology resource relative to facility users may include surveying/polling users of the facility (e.g., customers) as to their satisfaction with the facility, segment of the facility (e.g., line/division of the business/enterprise) and, in some instances in which the technology resource interfaces with the facility user, the technology resource itself. The user/customer's satisfaction with the facility and/or segment of the facility may be gauged in terms of (i) accessibility, (ii) navigation, (iii) personalization, (iv) convenience, (v) intuition, (vi) simplicity, (vii) availability, (viii) continuity, (ix) security, (x) capacity, (xi) deliverability, (xii) choice, (xiii) loyalty, (xiv) support and the like. The results of the results survey/poll may be quantified in a results score or index that is capable of being correlated with the level of performance 130 results.

In terms of qualitative value 160 of the technology resource the investment cost may include, but is not limited to, (i) strategy, (ii) operations, (iii) mainframe, (iv) network, (v) midrange, (vi) data center, (vii) workplace, (viii) architecture, and the like.

Referring to FIG. 4, a flow diagram is presented of a method 800 for technology resource utilization analysis and resource alteration, in accordance with embodiments of the present invention. At Event 810, first data is received that indicates, for each of a plurality of facilities, a level of performance for each of a plurality of technology resources relative to technology resource users. In specific embodiments of the invention, the first data is associated with surveying/polling individuals (e.g., associates/employees) that use a specified technology resource (e.g., software, hardware, system or the like) within a facility/enterprise as to the individual's satisfaction with the technology resource. In such embodiments of the invention, the first data may be raw data associated with the answers to the survey/poll and/or a quantitative score or index derived from the answers to the survey/poll. The first data may be received on a continuous basis (as survey results are received from an individual) and/or a predetermined basis (as a result of a polling/survey campaign or the like).

At Event 820, second data is received that indicates, for each of a plurality of facilities, results for each of a plurality of technology resources relative to facility users. In specific embodiments of the invention, the second data is associated with surveying/polling individuals (e.g., customers) that use facility as the individual's satisfaction with the facility and/or, in some embodiments in which the technology resource has a direct impact on the individuals/customers, the technology resource itself In such embodiments of the invention, the second data may be raw data associated with the answers to the survey/poll and/or a quantitative score or index derived from the answers to the survey/poll. The second data may be received on a continuous basis (as survey results are received from an individual) and/or a predetermined basis (as a result of a polling/survey campaign or the like).

At Event 830, third data is received that indicates, for each of the plurality of facilities, a qualitative value associated with each of the technology resources. As previously discussed, the quantitative value for the technology resource is at least one of at least one (i) an expenditure/cost over a period of time associated with the technology resource, and/or (ii)an appreciation or depreciation of the technology resource.

At Event 840, the first, second and third data associated with a facility is correlated for each technology resource in order to determine a technology resource metric that indicates, or is otherwise used to determine, a need to adjust the technology resource. Adjusting/altering the technology resource may include any change to the technology resource including, but s not limited to, increasing or decreasing the technology resource, upgrading or downgrading the technology resource, acquiring new technology resources, eliminating the technology resource or the like.

At Event 850, in response to determining the technology resource metric, at least one technology resource adjustment action 310 may be triggered. The technology resource adjustment action may be triggered based on the determined technology resource metric meeting, exceeding or falling below a predetermined technology resource metric threshold. The technology resource adjustment action may include, but is not limited to, actions associated with increasing or decreasing technology resources (e.g., allocating more or less technology resources, initiating alerts/notifications related to the allocation of more or less technology resources and the like).

At optional Event 860, the technology resource metric associated with a facility and a technology resource is compared to one or more technology resource metrics of other similar facilities and same technology resource to determine a technology resource index. As previously discussed, in specific embodiments of the invention, In such embodiments of the invention, the first, second and third data is shared and accessible amongst the plurality of facilities in a benchmarking/information exchange capacity, such that one facility is able to index, or otherwise benchmark, their technology resource metrics against their competitors metrics as a means of determining indices that indicate how the facility compares to their competitors in order to gauge the need for technology resource adjustment.

At optional Event 870 at least one of (i) the level of performance for the technology resource relative to the technology resource users, and/or (ii) the results for the technology resource relative to the facility users is predicted based on the technology resource index and adjustment to the qualitative value associated with the technology resource. In other embodiments of the method, a qualitative value for the technology resource is predicted based on the technology resource index and adjustment to one or more of the (i) the level of performance for the technology resource relative to the technology resource users, and/or (ii) the results for the technology resource relative to the facility users.

Thus, as described above, embodiments of the present invention provide for analyzing technology resources in terms of many different factors to determine a need to alter/adjust the technology resource. Specifically, the present invention correlates data associated with (i) a level of performance of a technology resource relative to technology resource users, (ii) results of the technology resource relative to facility users, and (iii) a qualitative value associated with the technology resource to determine a technology resource metric that indicates a need to alter/adjust the technology resource and trigger one or more actions associated with altering/adjusting the technology resource. In additional embodiments, the technology resource technology metric of one facility is compared to same/similar determined technology resource metric(s) of one or more other facilities as a means of deriving an index that is used to predict an overall volume of resources that are expected to be generated based on an increase in the qualitative value and or a change in other determinative factors (e.g., level of performance relative to technology resource users, results relative to facility users and the like).

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for technology resource utilization analysis and associated technology-related resource alteration, the system comprising:

a computing platform including a memory and at least one processor in communication with the memory;

a first database configured to store, in the memory, first data that indicates, for each of a plurality of facilities, a level of performance for each of a plurality of technology resources relative to a plurality of technology resource users;

a second database configured to store, in the memory, second data that indicates, for each of the plurality of facilities, results for each of the plurality of technology resources relative to a plurality of facility users;

a third database configured to store, in the memory, third data that indicates, for each of the plurality of facilities, a qualitative value associated with each of the plurality of technology resources;

a technology resource metric engine stored in the memory, executable by the at least one processor and configured to correlate, for one of the plurality of facilities and each of the technology resources, the first, second and third data associated with the facility to determine a technology resource metric that indicates a need to adjust a corresponding technology resource, wherein the technology resources include physical electronic data storage configured to store electronic mail;

a technology resource action engine stored in the memory, executable by the at least one processor and configured to, in response to determining the technology resource metric that indicates the need to adjust, trigger at least one action associated with adjusting the corresponding technology resource based on the determined technology resource metric, wherein the at least one action that is triggered includes increasing or decreasing the physical electronic data storage capacity for storing the electronic mail for a predetermined period of time or until an occurrence of a predetermined triggering event;

a technology resource index engine stored in the memory, executable by the at least one processor and configured to compare the technology resource metric to one or more technology resource metrics of one or more of the plurality of facilities to determine a technology resource index; and a predictive result engine stored in the memory, executable by the processor and configured to predict, based on the technology resource index and an adjustment to the qualitative value associated with the technology resource, at least one of (i) the level of performance for the technology resource relative to the technology resource users, and (ii) the results for the technology resource relative to the facility users.

2. The system of claim 1, wherein, in response to determining the technology resource index, at least one second action is triggered.

3. The system of claim 1, wherein the technology resource action engine is further configured to trigger at least one second action in response to determining that the technology resource index meets a predetermined technology resource index threshold.

4. The system of claim 1, wherein the predictive result engine is further configured to predict, based on the technology resource index, a resource accumulation increase based on an increase to the qualitative value associated with the technology resource.

5. The system of claim 1, further comprising a technology resource index tiering engine stored in the memory, executable by the at least one processor and configured to automatically adjust tiering of the facility based on the determined technology resource index.

6. The system of claim 1, wherein the first database is further is configured to store the first data that indicates, for each of a plurality of facilities, the level of performance for each of the plurality of technology resources relative to the plurality of technology resource users, wherein the first data is received through periodic assessments of the technology resource users as to a level of satisfaction with the technology resource.

7. The system of claim 1, wherein the second database is further configured to store the second data that indicates, for each of the plurality of facilities, results for each of the plurality of technology resources relative to the plurality of facility users, wherein the second data is received through periodic assessments of the facility users as to level of satisfaction with at least one of (i) the facility and (ii) the technology resource.

8. The system of claim 1, wherein the third database is further configured to store the third data that indicates, for each of the plurality of facilities, the qualitative value associated with each of the plurality of technology resources, wherein the qualitative value is at least one (i) an expenditure over a period of time associated with the technology resource, and (ii) an appreciation or depreciation of the technology resource.

9. The system of claim 1, wherein the action is at least one of (i) adjustment to the qualitative value associated with the technology resource, and (ii) a non-qualitative change to the technology resource.

10. The system of claim 1, wherein the technology resource metric engine is further configured to correlate, for one of the plurality of facilities and each of the technology resources, the first, second and third data associated with a segment of the facility to determine a segment-specific technology resource metric that indicates a need to trigger an action within the segment associated with the corresponding technology resource.

11. A method for technology resource utilization analysis and associated technology-related resource alteration, the method comprising:

receiving, at a computing device, first data that indicates, for each of a plurality of facilities, a level of performance for each of a plurality of technology resources relative to a plurality of technology resource users;

receiving, at the computing device, second data that indicates, for each of the plurality of facilities, results for each of the plurality of technology resources relative to a plurality of facility users;

receiving, at the computing device, third data that indicates, for each of the plurality of facilities, a qualitative value associated with each of the plurality of technology resources;

correlating, by a computing device processor for one of the plurality of facilities and each of the technology resources, the first, second and third data associated with the facility to determine a technology resource metric that indicates a need to adjust a corresponding technology resource, wherein the technology resources needing adjustment include physical electronic data storage configured to store electronic mail;

in response to determining the technology resource metric that indicates the need to adjust, triggering at least one action associated with adjusting the corresponding technology resource based on the determined technology resource metric, wherein the at least one action that is triggered includes increasing or decreasing the physical electronic data storage capacity for storing the electronic mail for a predetermined period of time or until an occurrence of a predetermined triggering event;

comparing the technology resource metric to one or more metrics of one or more of the plurality of facilities to determine a technology resource index; and predicting, based on the technology resource index and an adjustment to the qualitative value associated with the technology resource, at least one of (i) the level of performance for the technology resource relative to the technology resource users, and (ii) the results for the technology resource relative to the facility users.

12. The method of claim 11, further comprising, in response to determining the technology resource index meets a predetermined technology resource index threshold, triggering at least one second action.

13. The method of claim 11, wherein predicting further comprises predicting, based on the technology resource index, a resource accumulation increase based on an increase to the qualitative value associated with the technology resource.

14. A computer program product including a non-transitory computer-readable medium, the computer-readable medium comprising:
- a first set of codes for causing a computer to receive first data that indicates, for each of a plurality of facilities, a level of performance for each of a plurality of technology resources relative to a plurality of technology resource users;
- a second set of codes for causing a computer to receive second data that indicates, for each of the plurality of facilities, results for each of the plurality of technology resources relative to a plurality of facility users;
- a third set of codes for causing a computer to receive third data that indicates, for each of the plurality of facilities, a qualitative value associated with each of the plurality of technology resources; and
- a fourth set of codes for causing a computer to correlate, for one of the plurality of facilities and each of the technology resources, the first, second and third data associated with the facility to determine a technology resource metric that indicates a need to adjust a corresponding technology resource, wherein the technology resources needing adjustment include physical electronic data storage configured to store electronic mail;
- a fifth set of codes for causing a computer to, in response to determining the technology resource metric that indicates the need to adjust, triggering at least one action associated with adjusting the corresponding technology resource based on the determined technology resource metric, wherein the at least one action that is triggered includes increasing or decreasing the physical electronic data storage capacity for storing the electronic mail for a predetermined period of time or until an occurrence of a predetermined triggering event;
- a sixth set of codes for causing a computer to compare the technology resource metric to one or more metrics of one or more of the plurality of facilities to determine a technology resource index; and
- a seventh set of codes for causing a computer to predict, based on the technology resource index and an adjustment to the qualitative value associated with the technology resource, at least one of (i) the level of performance for the technology resource relative to the technology resource users, and (ii) the results for the technology resource relative to the facility users.

\* \* \* \* \*